March 15, 1966     J. T. HECKEL, JR., ET AL     3,240,544

FOOD SERVICE CART

Filed April 10, 1963     3 Sheets-Sheet 1

INVENTORS.
JOHN T. HECKEL, JR. and
BY LORANCE E. STERNS

*Lockwood, Woodard, Smith & Weikart*
Attorneys

INVENTORS.
JOHN T. HECKEL, JR. and
LORANCE E. STERNS
BY Lockwood, Woodard, Smith & Weikart
Attorneys March 15, 1966   J. T. HECKEL, JR., ETAL   3,240,544
FOOD SERVICE CART
Filed April 10, 1963   3 Sheets-Sheet 3
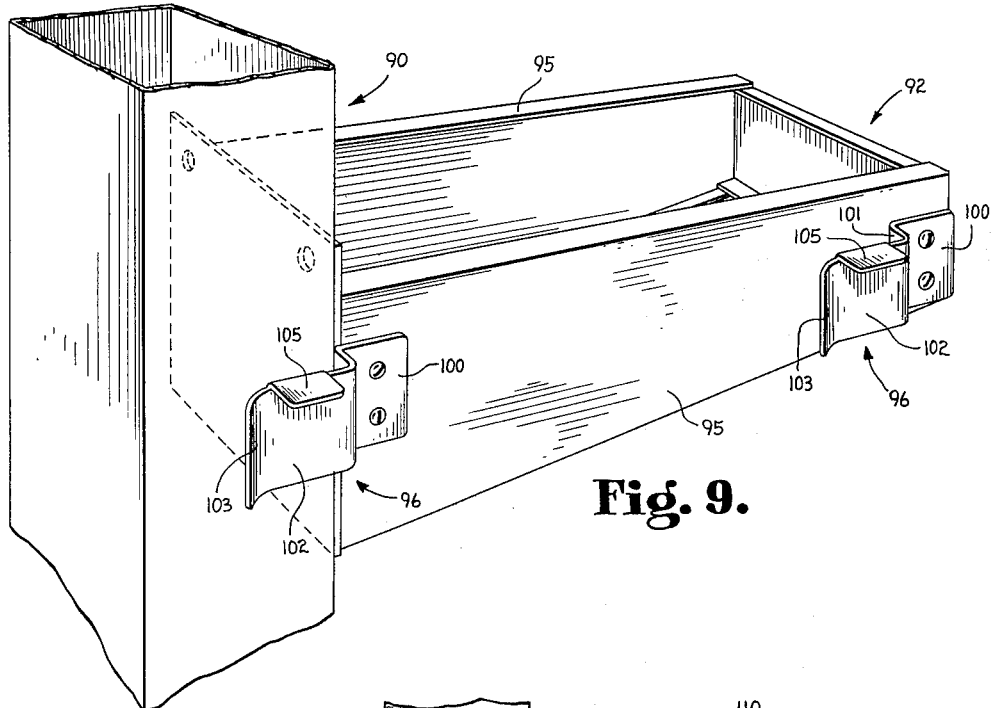
Fig. 9.
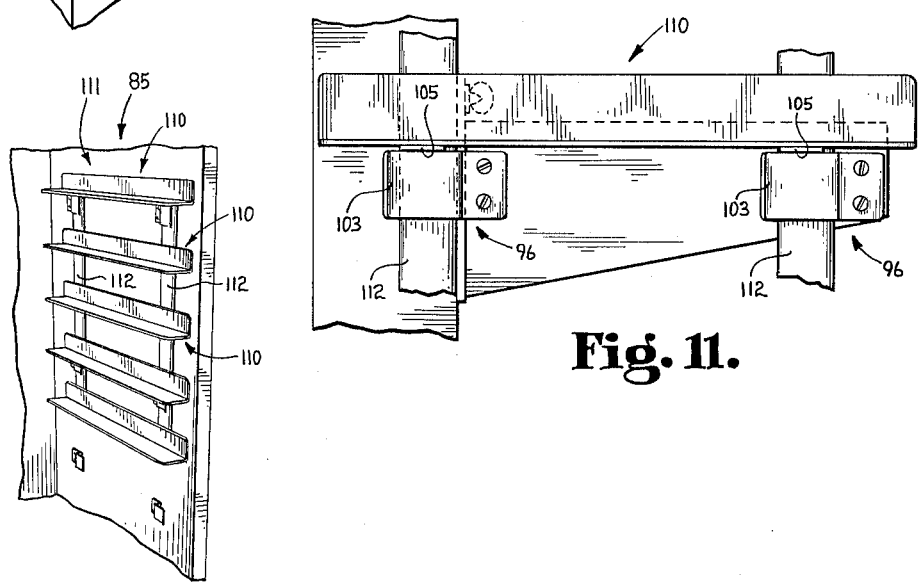
Fig. 10.
Fig. 11.
INVENTORS.
JOHN T. HECKEL, JR. and
BY LORANCE E. STERNS
Jackwood, Woodard, Smith & Weikart
Attorneys

United States Patent Office 3,240,544
Patented Mar. 15, 1966

3,240,544
FOOD SERVICE CART
John T. Heckel, Jr., and Lorance E. Sterns, Indianapolis, Ind., assignors, by mesne assignments, to J. Thomas Heckel, Jr., Indianapolis, Ind.
Filed Apr. 10, 1963, Ser. No. 271,968
2 Claims. (Cl. 312—214)

The present invention relates generally to food service carts for transporting individual meal trays, and more particularly to a cart for transporting individual trays of preportioned hot and cold food directly from the food preparation point to the consumer, the invention further relating to certain subcombinations of the above.

In many institutional and commercial establishments, such as hospitals, churches, factories, airlines, prisons, railroads, etc., it is desirable to deliver food to consumers on food serving trays. It is frequently desirable to serve both hot and cold food on the same tray. A food service cart has been proposed for transporting a plurality of individual meal trays in one compartment, each of the meal trays having both hot and cold food thereon. It has been found, however, that such previously proposed food service carts are not completely satisfactory in all respects. For example, such previously proposed carts cannot make use of standard single compartment trays or do not efficiently prevent the passage of heat and cold from one side of the compartment to the other or do not permit easy and convenient cleaning.

Consequently, a primary object of the present invention is to provide an improved food service cart.

A further object of the present invention is to provide a food service cart of the above type which employs a standard single compartment tray and which maintains at a minimum the passage of heat from the heated side to the refrigerated side of the compartment.

Still another object of the invention is to provide a food service cart which can be easily and quickly disassembled for cleaning yet which is sturdy and dependable in carrying out its intended purpose.

Related objects and advantages will become apparent as the description proceeds.

The full nature of the invention will be understood from the accompanying drawings and the following description and claims.

FIG. 9 is a perspective view of portions of the inside surface of a compartment forming a part of the cart of FIG. 1, said view showing means for mounting a rack illustrated in FIG. 10.

FIG. 10 is a perspective view of a removable rack mounted within the compartment of the cart of FIG. 1 for supporting food service trays.

FIG. 11 is an elevational view illustrating the structure of FIGS. 9 and 10 and showing the rack in mounted relation within the compartment.

Figure 1:
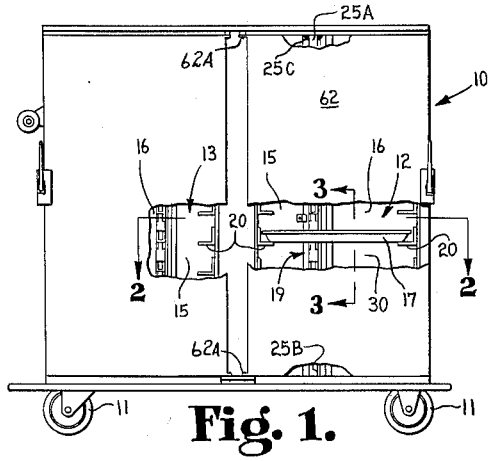
FIG. 1 is a front elevation of a food service cart embodying the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a food service cart 10 equipped with wheels 11 rotatably mounted upon the bottom of the cart for moving it from place to place. The cart has therein two compartments 12 and 13 equipped to receive a plurality of food service trays. Each of the compartments 12 and 13 is divided into a cold zone 15 and a hot zone 16. The food service trays, one of which 17 is shown in FIG. 1, are received within the compartment and are supported upon suitable racks 20 on each side of the compartment. It can be seen that the tray 17 extends into both the hot zone 16 and the cold zone 15 whereby hot foods such as, for example, meat and potatoes, can be kept warm while cold foods such as, for example, ice cream can be simultaneously kept cold.

Figure 2:
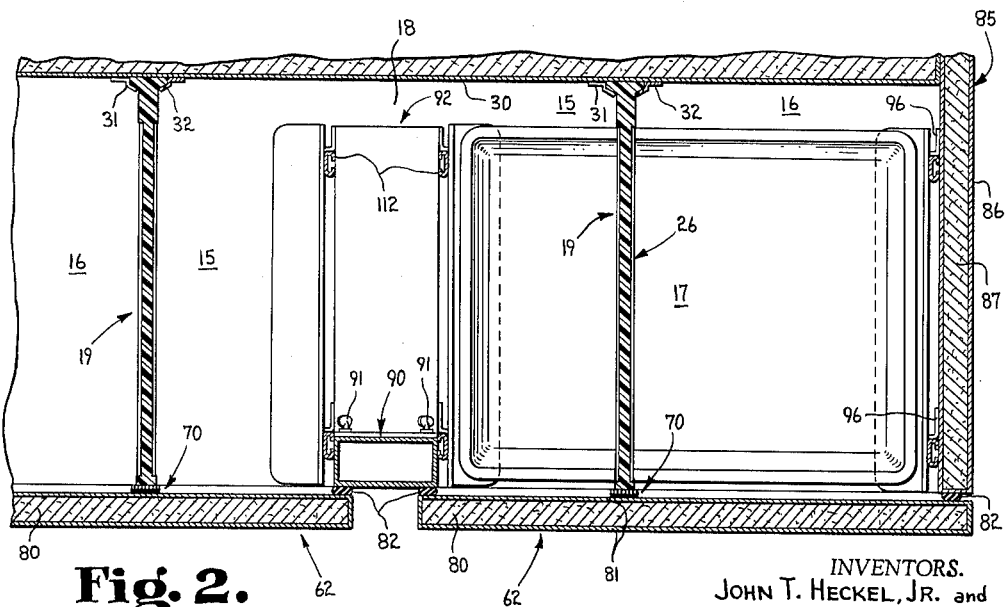
FIG. 2 is an enlarged fragmentary horizontal section taken along the line 2—2 of FIG. 1 in the direction of the arrows.

In the particular embodiment illustrated, the cold zone 15 of the compartments 12 and 13 are connected by a passage 18 (FIG. 2). Suitable conventional refrigeration and heating means are provided for maintaining the zones 15 and 16 at the desired temperatures.

Figure 8:
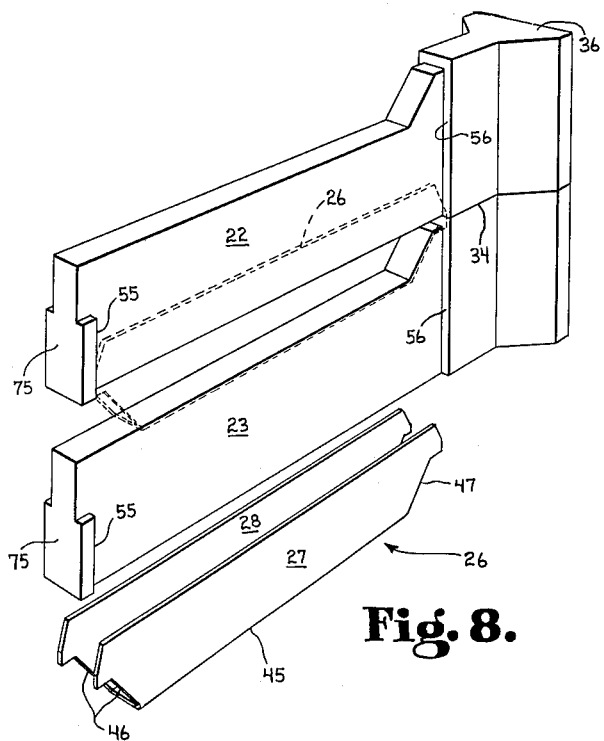
FIG. 8 is a perspective view of a portion of thermal barrier means forming a part of the structure of FIG. 1 and also illustrated in FIGS. 2–6.

The zones 15 and 16 of each compartment are separated by a thermal barrier means 19 which includes a plurality of identical webs 21–24 (see FIG. 8), 25A and 25B. The uppermost web (being identical to webs 21–24) has a cut-out in its upper surface which is in firm sealing engagement with an insulating member 25C which is inserted between the ceiling and the web to fill the space normally allowing the entry of a food tray. The member 25C is in sealing engagement with the ceiling of the compartment 12. A lowermost web 25B is identical to the webs 21–24 and its base is in sealing engagement with the bottom of the compartment.

Figure 4:
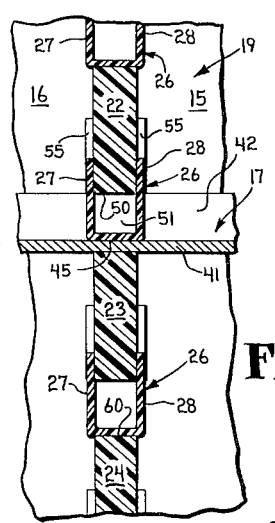
FIG. 4 is a fragmentary vertical section taken along the line 4—4 of FIG. 3 in the direction of the arrows.
Figure 6:
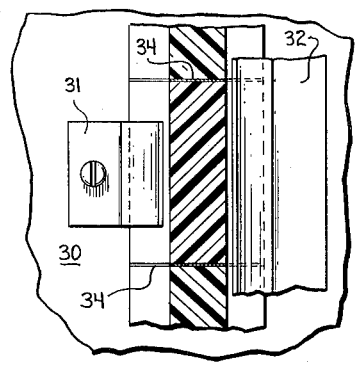
FIG. 6 is a fragmentary vertical section taken along the line 6—6 of FIG. 3 in the direction of the arrows.
Figure 5:
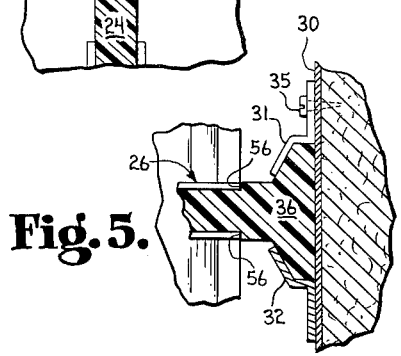
FIG. 5 is a fragmentary horizontal section taken along the line 5—5 of FIG. 3 in the direction of the arrows.

Each of the webs with the exception of the lowermost is provided with an elongated shutter 26 which has a U-shaped cross section as illustrated in FIG. 4 with the legs 27 and 28 of the shutter straddling the web next above. The shutter 26 is formed of plastic preferably that known as Cycolac, a trademark of Marbon Chemical Co., a division of Borg Warner Company of Chicago, Illinois. Considering, for example, the web 22, which is representative of all of the webs, the web 22 is fixed to the rear inside wall 30 of the compartment by means of brackets 31 and lock strip 32, said brackets being secured by screws 35 to the compartment rear and said lock strip being welded to the rear inside wall 30. The web 22 has an enlarged tapered portion 36 against which the brackets bear. The enlarged portions 36 have a greater vertical dimension than the remainder of the webs and are glued to the web above and the web below at the surfaces 34 of the enlarged portion of the web. Preferably, the webs are formed of an insulating material known by the trademark "Frost Wood" and manufactured by Dow Chemical Co., Midland, Michigan.

FIG. 4 shows the tray 17 between the web 23 and the web 22. The tray 17 has a flat bottom-wall food-receiving section 41 and also includes a rim 42 which extends completely around the periphery of the flat section. Such a tray is the conventional type found in institutions where the food serving cart of the present invention is useful. The shutter 26 has a flat bottom or base portion 45 and has downwardly and inwardly tapered ends 46 and 47 adjoining said flat bottom portion 45. The ends 46, 47 and bottom 45 conform to the inside shape of the tray 17 and thus block the passage of air from one zone to the other of zones 15 and 16.

The U-shaped cross section of the shutter 26 defines along with the lower surface 50 of the web, a chamber 51 which also acts to block the passage of heat from zone 16 to zone 15. The shutter 26 is vertically slidable upon the web 22 and is guided so that it is maintained against horizontal movement by vertically extending mutually facing spaced surfaces 55 and 56 of the web 22.

Figure 3:
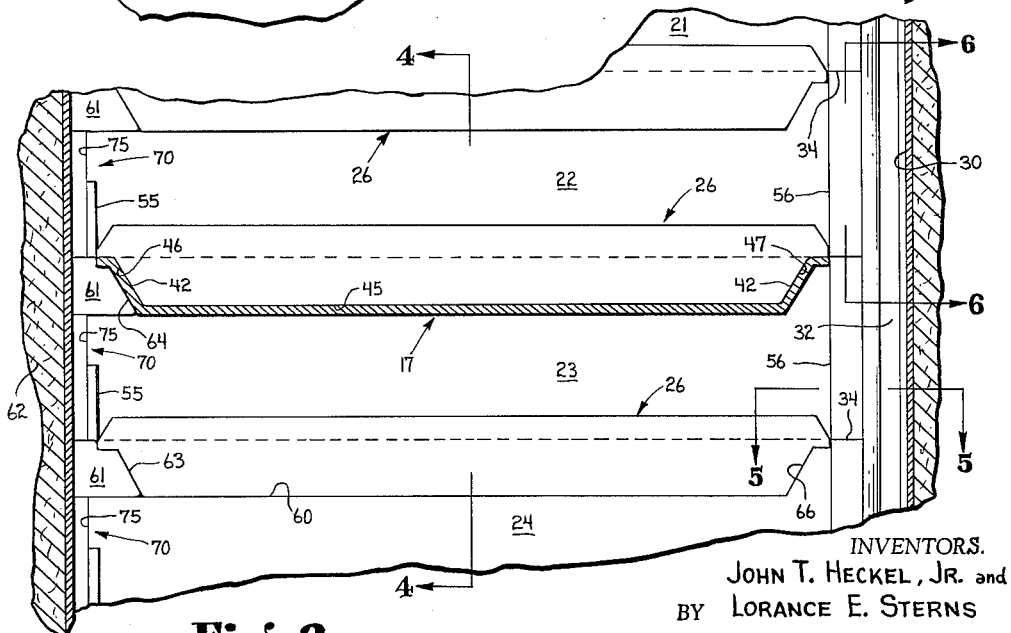
FIG. 3 is an enlarged fragmentary vertical section taken along the line 3—3 of FIG. 1 in the direction of the arrows.

The lower web 23 of FIG. 4 is also provided with a shutter 26 which is shown without a tray therebeneath. The tray 17 can be removed from the compartment 12 by opening the door 62 which is hinged at 62A and by pulling the tray from between the webs. When the tray 17 is removed, the shutter is first cammed upwardly by the rim 42 and then is permitted to drop back downwardly so that it engages the web therebeneath. Referring to FIG. 3, the shutter mounted on the web 23 is shown in this position and engaging the web 24. It can be seen that the shutter 26 mounted on the web 23 substantially fills the space between the webs 23 and 24 and engages the flat surface 60 of the web 24 therebeneath. The shutter also engages a filler block or divider 61 mounted upon the door 62 of the compartment and also engages a surface 66 of the web next below. The fit or mounting of the shutter on the web is made somewhat sloppy or loose in order that it will easily drop into proper engagement with the web therebeneath when the associated tray is withdrawn.

Figure 7:
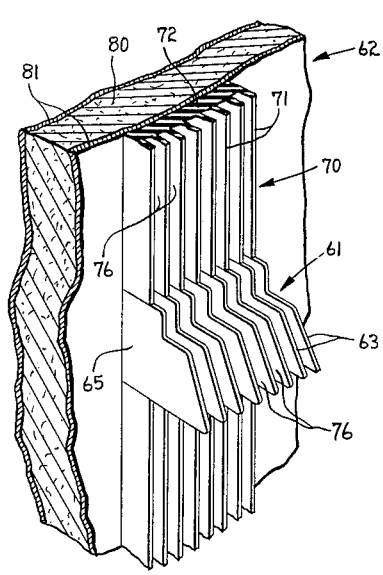
FIG. 7 is an enlarged perspective fragmentary view of a portion of a door and of thermal barrier means forming a part of the food service cart of FIG. 1.

The divider 61 is shown in detail in FIG. 7 and includes a plurality of parallel projections 63 which are joined by a base 65. The projections 63 are formed to fit the outer lower surface 64 of the rims 42 of the trays 17 or the surface 46 of the shutter. The projections 63 are flexible and resilient and, when the door 62 is closed, either resiliently engage the trays or resiliently engage the ends 46 of shutters 26.

As can be seen in FIG. 3, the fact that the tray is removed (as shown between the webs 23 and 24) does not mean that a space is left between the shutter of the web 22 and the web 23. Instead, the shutter of the web 22 moves downwardly and fills the space left by the removal of the tray. This effect is illustrated in FIG. 3 as regards the relationship of the web 23, the web 24 and the shutter for the web 23. When the shutter moves downwardly to engagement with the upper surface 60 of the web 24, the ends 46 and 47, because of their tapering relationship, occupy the space previously occupied by the tray 17 and engage the divider 61 and the surface 66 of the web 24.

Thus, the flow of heat from the zone 16 to the zone 15 of the compartment is blocked. The nature of the relationship between the surface 66 of the web 24 and the shutter end 47 is either one of engagement, near engagement, or overlapping. As mentioned above, the shutter is loosely mounted on the web which results in the above somewhat variable relationship. Also, the resilient nature of the filler block tends to urge the shutter 26 of web 23 rightwardly as viewed in FIG. 3 when the shutter is down. In any event, the relationship of the end 47 and the surface 66 is one preventing the passage of heat from zone 16 to zone 15.

Also mounted upon the door 62 between each pair of filler blocks or dividers 61 are further filler blocks or dividers 70. The further dividers 70 include flexible projecting portions 71 joined by a base 72. When the door 62 is closed, the dividers 70 engage the flat surfaces 75 of the webs so as to block the flow of heat from the zone 16 to the zone 15. In the case of the dividers 70 as well as the dividers 61, the flexible resilient nature thereof insures that the dividers conform to the shape of the members which they engage leaving no openings therebetween for the passage of heat. Also, the plurality of projections 71 and 63 produce a plurality of vertically extending chambers 76 which act as insulating chambers between the two zones 15 and 16.

One of the most important features of U-shaped shutter 26 is the fact that its legs 27 and 28 can be spread slightly in order to permit removal of the shutter from its web for cleaning purposes.

Referring to FIG. 2, certain details of construction of the food service cart are illustrated as including insulating material 80 received within the doors 62, the outer portion of the doors being formed of sheet metal 81. Each of the doors 62 engages a flexible gasket 82 which is mounted on the food service cart and serves to prevent air flow out of or into the cart. The sidewalls 85 of the cart are constructed, similarly to the doors, of sheet metal 86 and insulating material 87. The frame of the cart further includes a vertical post 90 of rectangular cross-section (FIGS. 2 and 9).

Secured to the post 90 by thumbscrews 91 is a plurality of cantilever beams 92 (one of which is shown in FIG. 9). The cantilever beams 92 each include tapering channels 95. Spring mounting elements 96 are secured to the channels 95 and to the inside surface of the outer walls 87 of the cart. Each of the spring elements 96 includes a first portion 100 which is fixed to the channel or wall and includes a second portion 101 which projects outwardly away from the wall. Integral with the portion 101 is a further portion 102 which is parallel to the wall and has an outwardly curved projection 103 on its end. The parallel portion 102 also has joined to its upper edge an outwardly projecting portion 105.

The spring mounting members 96 are used to mount the series of tray supports 110 to the cantilever beams 92 and to the wall 85. The tray supports 110 are connected together by members 112 to form a plurality of rigid groups 111 each including five tray supports 110, each of said members 112 being of C-shaped cross section and extending vertically. The members 112 are welded to each of the tray supports 110 which have an angular shape. The use of the spring mounting members 96 to mount the tray supports is illustrated in FIGS. 10 and 11. Two of the five tray supports of each group are supported by the outwardly projecting portions 105 of the spring mounts. When the tray support group is mounted, the parallel portions 102 of the spring mounts resiliently bear against the vertical members 112, each vertical member extending between the spring mount and the wall 85 or post 90 or channel 95.

The mounting arrangement of the tray supports 110 produces a sturdy mounting yet permits quick easy disassembly for cleaning purposes. The rigid group of tray supports can be rapidly dismounted from the spring mounts by pulling the group toward the door opening. Such pulling causes the vertical members 112 to pass from beneath the spring pressure of the parallel portions 102. The group of tray supports can then be moved directly away from the wall or channel and withdrawn from the compartment. When the tray support group has been removed from the compartment, it can be easily submerged in a sink full of water for cleaning. Remounting of the group of tray supports is easily accomplished by merely placing the group against the wall and by pushing the group rearwardly in the compartment so that the members 112 cam against the curved portion 103 and parallel portions 102 until the group is mounted.

From the above description, it will be evident that the present invention provides an improved food service cart which employs a standard single compartment tray and yet which maintains at a minimum the passage of heat from the heated side to the refrigerated side of the tray compartment. It will also be evident from the above description that the present invention provides a food service cart which can be easily and quickly disassembled for cleaning, yet which is sturdy and dependable in operation. Thus, the U-shaped shutter 26 can be quickly and easily removed and remounted as can the various groups of tray supports 110.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A food service cart comprising a housing defining a compartment, a tray having a food-receiving section defining the bottom wall of said tray and surrounded by a rim, thermal barrier means dividing said compartment into two thermally different zones, said thermal barrier means including an elongated first web having a lower edge extending across the rim of said tray, an elongated second web extending across the bottom surface of said bottom wall of said tray and engaging same, a door mounted on said cart and defining a portion of each of the zones of said compartment, elongated shutter means vertically movable in relation to said first web for vertical movement, said shutter means tapering downwardly and inwardly at its opposite ends to conform to the inside shape of said tray rims, said shutter engaging said bottom wall of said tray and said rims, a thermal insulating block secured to said door and having a shape to conform to the outside of said tray rim and end of said shutter to provide additional thermal barrier means between said zones, said block being formed of resilient material and including a base portion and a plurality of parallel projecting resilient portions which engage said tray to define with said tray a plurality of insulating chambers.

2. A food service cart comprising a housing defining a compartment adapted to removably receive a tray having a food-receiving section defining the bottom wall of said tray and surrounded by a rim, thermal barrier means dividing said compartment into two thermally different zones, said thermal barrier means including an elongated first web having a lower edge adapted to extend across said compartment and the rim of said tray when so in place, an elongated second web extending across said compartment vertically below said first web adapted to extend across the bottom surface of said bottom wall of said tray and engaging same when the tray is in place, a door mounted on said cart and defining a portion of each of the zones of said compartment, elongated shutter means vertically movable in relation to said first web for vertical sliding movement, said shutter means tapering downwardly and inwardly at its opposite ends to conform to the inside shape of said tray rims, said shutter adapted to engage said bottom wall of said tray and said rims, a thermal insulating block secured to said door and having a shape to conform to the outside of said tray rim and end of said shutter to provide additional thermal barrier means between said zones, said block being formed of resilient material and including a base portion and a plurality of parallel projecting resilient portions which engage said tray to define with said tray and when said tray is not in play with said shutter a plurality of insulating chambers.

References Cited by the Examiner

UNITED STATES PATENTS

| | | | |
|---|---|---|---|
| 1,452,703 | 4/1923 | Pollard | 20—68 |
| 2,263,862 | 11/1941 | Usmar | 312—236 |
| 2,790,696 | 4/1957 | Saunders | 312—351 |
| 2,791,479 | 5/1957 | Jasin | 312—351 |
| 2,917,796 | 12/1959 | Kunkel | 20—68 |
| 3,129,041 | 4/1964 | Traycoff | 312—236 |

FOREIGN PATENTS 632,795  12/1961  Canada.

F. B. SHERRY, *Primary Examiner.*

CHANCELLOR E. HARRIS, *Examiner.*